United States Patent [19]
Lee

[11] Patent Number: 5,274,476
[45] Date of Patent: Dec. 28, 1993

[54] CCD IMAGE SENSOR WITH PHOTODIODES IN A ZIG-ZAG PATTERN AND PARTICULAR TRANSFER GATE ELECTRODES FORMED OVER CHANNEL STOP REGIONS AND VCCD REGIONS

[75] Inventor: Sung M. Lee, Seoul, Rep. of Korea

[73] Assignee: Gold Star Electron Co., Ltd., Rep. of Korea

[21] Appl. No.: 928,517

[22] Filed: Aug. 11, 1992

[30] Foreign Application Priority Data

Aug. 14, 1991 [KR] Rep. of Korea ............... 14038/1991

[51] Int. Cl.⁵ ..................... H04N 1/024; H04N 1/028; H04N 5/335
[52] U.S. Cl. .............. 358/483; 358/213.22; 358/213.23; 358/212; 257/232; 257/233
[58] Field of Search .............. 358/483, 482, 213.11, 358/213.22, 213.23, 213.26, 213.27, 213.28, 212; 437/53; 257/443, 222, 225, 229, 231, 232, 233, 234, 292

[56] References Cited

U.S. PATENT DOCUMENTS

| | | | |
|---|---|---|---|
| 4,012,587 | 3/1977 | Ochi et al. | 358/213.26 |
| 4,200,892 | 4/1980 | Weimer | 358/213.11 |
| 4,336,556 | 6/1982 | Sekine et al. | 358/213.26 |
| 4,471,387 | 9/1984 | Nadler | 358/213.22 |
| 4,558,365 | 12/1985 | Ochi | 358/213.11 |
| 4,602,289 | 7/1986 | Sekine | 358/213.22 |
| 4,884,143 | 11/1989 | Uya | 358/213.28 |

Primary Examiner—Edward L. Coles, Sr.
Assistant Examiner—Scott A. Rogers
Attorney, Agent, or Firm—Poms, Smith, Lande & Rose

[57] ABSTRACT

A CCD image sensor having a plurality of VCCDs each formed in a zig-zag pattern in a vertical direction and a plurality of groups of first to fourth photodiodes, the first to fourth photodiodes of the respective groups being arranged respectively on the left and right sides of each of the VCCDs, so that an improvement in resolution of a picture can be made in the same chip size. The first photodiodes are arranged on the left sides of curved portions of each of the VCCD regions on odd horizontal scanning lines, the second photodiodes are arranged on the right sides of the curved portions of each of the VCCD regions on even horizontal scanning lines, the third photodiodes are arranged on the right sides of the curved portions of each of the VCCD regions on the odd horizontal scanning lines, and the fourth photodiodes are arranged on the left sides of the curved portions of each of the VCCD regions on the even horizontal scanning lines. The third photodiodes and the fourth photodiodes are lined up in a straight line in the vertical direction.

3 Claims, 9 Drawing Sheets

| 1 | 1 | 1 | 1 | 1 | 1 | 1 |
|---|---|---|---|---|---|---|
| 2 | 2 | 2 | 2 | 2 | 2 | 2 |
| 1 | 1 | 1 | 1 | 1 | 1 | 1 |
| 2 | 2 | 2 | 2 | 2 | 2 | 2 |
| 1 | 1 | 1 | 1 | 1 | 1 | 1 |
| 2 | 2 | 2 | 2 | 2 | 2 | 2 |
| 1 | 1 | 1 | 1 | 1 | 1 | 1 |

FIG. 8c

| 1 | 3 | 1 | 3 | 1 | 3 |
|---|---|---|---|---|---|
| 4 | 2 | 4 | 2 | 4 | 2 |
| 1 | 3 | 1 | 3 | 1 | 3 |
| 4 | 2 | 4 | 2 | 4 | 2 |
| 1 | 3 | 1 | 3 | 1 | 3 |
| 4 | 2 | 4 | 2 | 4 | 2 |

FIG. 8d

| 1 | T | 3 | 1 | T | 3 | 1 | T | 3 | 1 | T | 3 | 1 | T | 3 | 1 | TR |
|---|---|---|---|---|---|---|---|---|---|---|---|---|---|---|---|---|
| L | 2 | 4 | C | 2 | 4 | C | 2 | 4 | C | 2 | 4 | C | 2 | 4 | C | 2 |
| 1 | C | 3 | 1 | C | 3 | 1 | C | 3 | 1 | C | 3 | 1 | C | 3 | 1 | R |
| L | 2 | 4 | C | 2 | 4 | C | 2 | 4 | C | 2 | 4 | C | 2 | 4 | C | 2 |
| 1 | C | 3 | 1 | C | 3 | 1 | C | 3 | 1 | C | 3 | 1 | C | 3 | 1 | R |
| L | 2 | 4 | C | 2 | 4 | C | 2 | 4 | C | 2 | 4 | C | 2 | 4 | C | 2 |
| 1 | C | 3 | 1 | C | 3 | 1 | C | 3 | 1 | C | 3 | 1 | C | 3 | 1 | R |
| L | 2 | 4 | C | 2 | 4 | C | 2 | 4 | C | 2 | 4 | C | 2 | 4 | C | 2 |
| 1 | C | 3 | 1 | C | 3 | 1 | C | 3 | 1 | C | 3 | 1 | C | 3 | 1 | R |
| BL | 2 | 4 | B | 2 | 4 | B | 2 | 4 | B | 2 | 4 | B | 2 | 4 | B | 2 |

CCD IMAGE SENSOR WITH PHOTODIODES IN A ZIG-ZAG PATTERN AND PARTICULAR TRANSFER GATE ELECTRODES FORMED OVER CHANNEL STOP REGIONS AND VCCD REGIONS

BACKGROUND OF THE INVENTION

1. Field of the Invention

The present invention relates in general to a charge coupled device (CCD) image sensor, and more particularly to a CCD image sensor having a plurality of vertical charge coupled devices (VCCDs) each formed in a zig-zag pattern in a vertical direction and a plurality of groups of photodiodes, the photodiodes of the respective groups being arranged respectively on the left and right sides of each of the VCCDs, so that an improvement in resolution of a picture can be made in the same chip size.

2. Description of the Prior Art

Generally, a CCD is believed to be an active device for transferring under a control of a clock pulse a signal charge corresponding to incident light incoming along a predetermined path and has typically been used in image processing devices, such as, for example, a storage device, a logic element, a CCD image sensor and etc..

The scanning of the CCD image sensor employing the CCD is typically of an interlaced scanning type and a non-interlaced scanning type.

In the non-interlaced scanning, there are provided frames each containing a plurality of fields, the scanning on the screen being in sequence performed beginning with data in the first input field. On the other hand, in the interlaced scanning, there are provided frames each containing a plurality of even fields and a plurality of odd fields, the scanning on the screen being in turn performed beginning with data in the odd field.

Therefore, in the non-interlaced scanning, the scanning rate is fast such that the actual image of a fast moving object can be picked up accurately. For this reason, the non-interlaced scanning may be applied to a military equipment, such as a missile.

However, a problem with this non-interlaced scanning is that the image shakes on the screen.

For the interlaced scanning, there is provided a sense of stability of the image in that the scanning rate is slower than that in the non-interlaced scanning, but a fast moving object appears as two images. For this reason, the interlaced scanning is inappropriate to a military purpose and typically applied to a television broadcasting system, such as a NTSC system or a PAL system, for the scanning of image on the screen.

An example of a conventional CCD image sensor of the interlaced scanning type will now be mentioned with reference to FIGS. 1 through 4.

Referring to FIG. 1, there is shown a schematic diagram of a construction of the conventional CCD image sensor of the interlaced scanning type. The conventional CCD image sensor comprises a plurality of vertical charge coupled device (VCCD) regions VCCD arranged at a constant interval in a horizontal direction with respect to one another, each of the VCCD regions VCCD being extended to a desired length in a vertical direction, a plurality of groups of photodiodes PD each for generating a signal charge in response to incident light, the photodiodes PD of the respective groups being arranged at one side of each of the VCCD regions VCCD and at a constant interval in the vertical direction with respect to one another, a horizontal charge coupled device (HCCD) region HCCD for transferring in the horizontal direction the signal charges which are transferred from the photodiodes PD through the VCCD regions VCCD thereto, and a sensing amplifier AMP for converting the signal charges from the HCCD region HCCD into voltage information and outputting the voltage information externally.

Referring to FIG. 2, there is shown a layout diagram of the construction of the conventional CCD image sensor in FIG. 1. As shown in this figure, transfer gates TG are provided to transfer the signal charges from the photodiodes PD to the VCCD regions VCCD. Since each of the frames contains the two fields or odd and even fields, each of the transfer gates TG consists of two transfer gates TG1 and TG2 corresponding respectively to the odd and even fields. The first transfer gates TG1 are provided to transfer to the VCCD regions VCCD the signal charges from the photodiodes PD1 arranged in the odd order in the vertical direction in the odd fields or arranged on the odd horizontal scanning lines and the second transfer gates TG1 are provided to transfer to the VCCD regions VCCD the signal charges from the photodiodes PD2 arranged in the even order in the vertical direction in the even fields or arranged on the even horizontal scanning lines.

Transfer gate electrodes PG1 and PG2 are connected respectively to the first and second transfer gates TG1 and TG2 such that the signal charges from the photodiodes PD are transferred to the VCCD regions VCCD in response to VCCD clock signals $V\phi1-V\phi4$ of four phases which are applied respectively to the transfer gate electrodes PG1 and PG2, one clock signal corresponding to one phase.

FIG. 3a is a sectional view, taken on the line a—a' of FIG. 2, which illustrates portions in which the transfer gates are formed and FIG. 3b is a sectional view, taken on the line b—b' of FIG. 2B, which illustrates portions in which the transfer gates are not formed. The conventional CCD image sensor comprises a N type substrate 100 and a P type well 200, formed on the N type substrate 100. The N type photodiodes PD and the N type VCCD regions VCCD are, in turn, successively arranged on the N type substrate 100, with adjacent ones of the photodiodes PD and VCCD regions VCCD being isolated from each other at a desired interval via a channel stop region ST. On the surface of each of the N type photodiodes PD is formed a P+ type thin layer 300 for application of an initial bias voltage. Herein, the P type well 200 is comprised of two types of wells, a shallow P type well 200a and a deep P type well 200b, for control of over flow drain (OFD) voltage, the shallow P type well 200a being formed under each of the N type photodiodes PD and the deep P type well 200b being formed under each of the N type VCCD regions VCCD.

In FIG. 3a, a first transfer gate electrode PG1b of the transfer gate electrode PG1 is formed over the N type VCCD region VCCD and the channel stop region ST for application of the first clock signal $V\phi1$. The first transfer gate TG1 is connected to the first transfer gate electrode PG1b for connection of the photodiode PD with the VCCD region VCCD therethrough.

In FIG. 3b, a second transfer gate electrode PG1a of the transfer gate electrode PG1 is formed over the N type VCCD region VCCD and the channel stop region ST for application of the second clock signal $V\phi2$. The photodiode PD and VCCD region VCCD are isolated from each other at a desired interval via the channel stop region ST.

FIG. 4a is a timing diagram of the VCCD clock signals $V\phi1$-$V\phi4$ which are applied respectively to the transfer gate electrodes PG1 and PG2, FIG. 4b is a pulse waveform diagram of the VCCD clock signals $V\phi1$-$V\phi4$ at the unit interval K of FIG. 4a and FIG. 4c is a pixel format of one picture, or one frame in the conventional CCD image sensor of the interlaced scanning type.

The operation of the conventional CCD image sensor of the above-mentioned construction will hereinafter be described.

In operation, upon receiving the incident light, the photodiodes PD generate the signal charges in proportion to an intensity of the light. The generated signal charges are transferred to the VCCD regions VCCD in response to the VCCD clock signals $V\phi1$-$V\phi4$ which are applied to the transfer gate electrodes PG1 and PG2. In other words, in the odd fields, a voltage V1 of high level is applied to the first transfer gates TG1 by the VCCD clock signals $V\phi1$ and $V\phi2$ which are applied to the transfer gate electrodes PG1. As a result, transferred to the VCCD regions VCCD are the signal charges generated from the photodiodes PD1 arranged on the odd horizontal scanning lines. On the other hand, in the even fields, a voltage V2 of high level is applied to the second transfer gates TG2 by the VCCD clock signals $V\phi3$ and $V\phi4$ which are applied to the transfer gate electrodes PG2. As a result, transferred to the VCCD regions VCCD are the signal charges generated from the photodiodes PD2 arranged on the even horizontal scanning lines.

The signal charges transferred to the VCCD regions VCCD are then transferred to the HCCD region HCCD, which feeds the transferred signal charges to the sensing amplifier AMP in response to a HCCD clock signal applied thereto. Finally, the sensing amplifier AMP converts the signal charges from the HCCD region HCCD into voltage information and outputs the voltage information externally.

The image signals outputted in this manner are arranged in a form as shown in FIG. 4c. Namely, the image signals outputted upon application of the voltage V1 of high level to the first transfer gates TG1 in the odd fields are arranged at the positions designated by "1" and the image signals outputted upon application of the voltage V2 of high level to the second transfer gates TG2 in the even fields are arranged at the positions designated by "2".

However, the above-mentioned conventional CCD image sensor of the interlaced scanning type has a disadvantage, in that the photodiodes are arranged at only one side of the VCCD regions, thereby resulting in a low resolution of the picture. A prior art attempt to extend the areas of the photodiodes to enhance the resolution of the picture has a difficulty in the same chip size since the areas of the photodiodes are restricted by the VCCD regions. For this reason, the prior art attempt cannot be accomplished without an increase in the chip size.

SUMMARY OF THE INVENTION

Therefore, the present invention has been made in view of the above problem, and it is an object of the present invention to provide a CCD image sensor having a plurality of VCCDs each formed in a zig-zag pattern in a vertical direction and a plurality of groups of photodiodes, the photodiodes of the respective groups being arranged respectively on the left and right sides of each of the VCCDs, so that an improvement in resolution of a picture can be made in the same chip size.

In accordance with the present invention, the above object can be accomplished by a provision of a CCD image sensor comprising: a plurality of VCCD regions arranged at a constant interval in a horizontal direction with respect to one another, each of the VCCD regions being formed in a zig-zag pattern having a series of curved portions in a vertical direction and being extended to a desired length in the vertical direction; a plurality of groups of first to fourth photodiodes each for generating a signal charge in response to incident light, the first to fourth photodiodes of the respective groups being arranged respectively on the left and right sides of each of said VCCD regions and being isolated from the adjacent VCCD regions via channel stop regions, the first photodiodes being arranged on the left sides of the curved portions of each of said VCCD regions on odd horizontal scanning lines, the second photodiodes being arranged on the right sides of the curved portions of each of said VCCD regions on even horizontal scanning lines, the third photodiodes being arranged on the right sides of the curved portions of each of said VCCD regions on the odd horizontal scanning lines, and the fourth photodiodes being arranged on the left sides of the curved portions of each of said VCCD regions on the even horizontal scanning lines; a HCCD region for transferring in the horizontal direction the signal charges which are transferred from said first to fourth photodiodes through said VCCD regions thereto; a plurality of first transfer gates for connecting said first photodiodes to each of said VCCD regions; a plurality of second transfer gates for connecting said second photodiodes to each of said VCCD regions; a plurality of third transfer gates for connecting said third photodiodes to each of said VCCD regions; a plurality of fourth transfer gates for connecting said fourth photodiodes to each of said VCCD regions; a plurality of first transfer gate electrodes each formed over each of said channel stop regions and each of said VCCD regions, the first transfer gate electrodes being connected respectively to said first transfer gates for application of a first VCCD clock signal; a plurality of second transfer gate electrodes each formed over each of said channel stop regions and each of said VCCD regions, the second transfer gate electrodes being connected respectively to said third transfer gates for application of a second VCCD clock signal; a plurality of third transfer gate electrodes each formed over each of said channel stop regions and each of said VCCD regions, the third transfer gate electrodes being connected respectively to said fourth transfer gates for application of a third VCCD clock signal; and a plurality of fourth transfer gate electrodes each formed over each of said channel stop regions and each of said VCCD regions, the fourth transfer gate electrodes being connected respectively to said second transfer gates for application of a fourth VCCD clock signal.

BRIEF DESCRIPTION OF THE DRAWINGS

The above and other objects, features and advantages of the present invention will be more clearly understood from the following detailed description taken in conjunction with the accompanying drawings, in which:

FIG. 4b is a pulse waveform diagram of the VCCD clock signals at the unit interval K of FIG. 4a;

FIG. 8b is a pulse waveform diagram of the VCCD clock signals at the unit interval K of FIG. 8a;

FIG. 8c is a pixel format of one picture, or one frame which is provided by the CCD image sensor of the interlaced scanning type according to the present invention; and FIG. 8d is a pixel format of another picture which is provided by the CCD image sensor of the interlaced scanning type according to the present invention.

DETAILED DESCRIPTION OF THE INVENTION

Figure 4A:
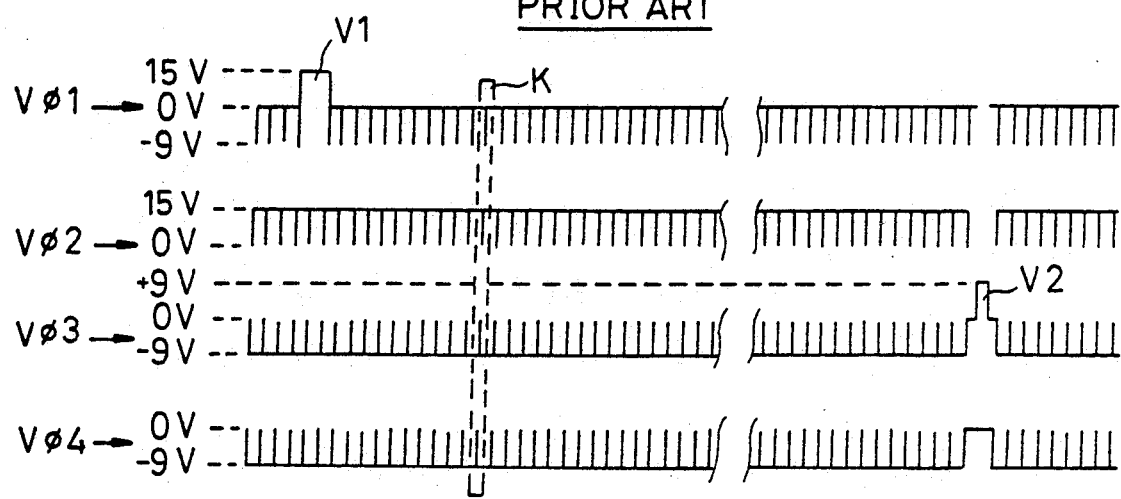
FIG. 4a is a timing diagram of VCCD clock signals in the conventional CCD image sensor of the interlaced scanning type.
Figure 4B:
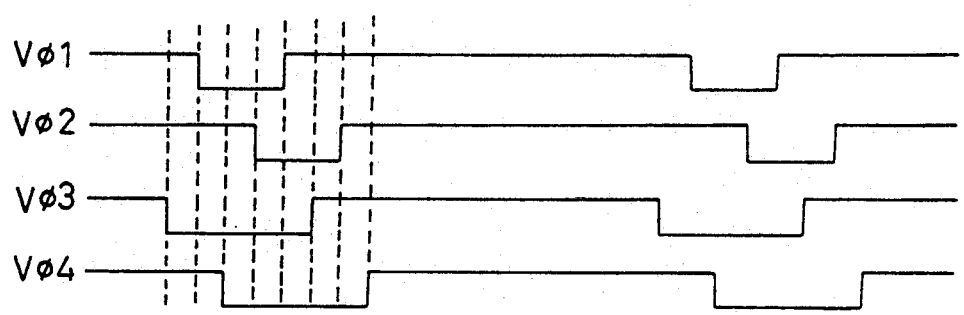
Figures 4C, 5:
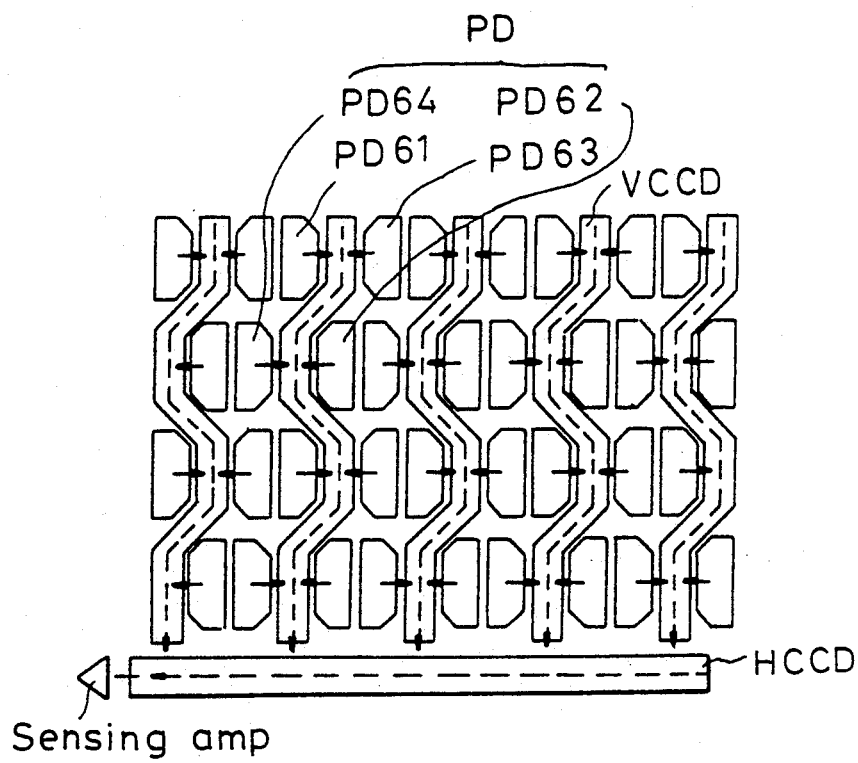
FIG. 4c is a pixel format of one picture, or one frame which is provided by the conventional CCD image sensor of the interlaced scanning type.
FIG. 5 is a schematic diagram of a construction of a CCD image sensor of the interlaced scanning type in accordance with the present invention.

Referring to FIG. 5, there is shown a schematic diagram of a construction of a CCD image sensor of the interlaced scanning type in accordance with the present invention. As shown in this figure, the CCD image sensor of the present invention comprises a plurality of VCCD regions VCCD arranged at a constant interval in a horizontal direction with respect to one another, each of the VCCD regions VCCD being formed in a zig-zag pattern having a series of curved portions in a vertical direction and being extended to a desired length in the vertical direction, and a plurality of groups of first to fourth photodiodes PD61-PD64 each for generating a signal charge in response to incident light, the first to fourth photodiodes PD61-PD64 of the respective groups being arranged respectively on the left and right sides of each of the VCCD regions VCCD and being isolated from the adjacent VCCD regions via channel stop regions ST, the first photodiodes PD61 being arranged on the left sides of the curved portions of each of the VCCD regions VCCD on odd horizontal scanning lines, the second photodiodes PD62 being arranged on the right sides of the curved portions of each of the VCCD regions VCCD on even horizontal scanning lines, the third photodiodes PD63 being arranged on the right sides of the curved portions of each of the VCCD regions VCCD on the odd horizontal scanning lines, and the fourth photodiodes PD64 being arranged on the left sides of the curved portions of each of the VCCD regions VCCD on the even horizontal scanning lines.

Also, the CCD image sensor of the present invention comprises a HCCD region HCCD for transferring in the horizontal direction the signal charges which are transferred from the first to fourth photodiodes PD61-PD64 through the VCCD regions VCCD thereto, and a sensing amplifier AMP for converting the signal charges from the HCCD region HCCD into voltage information and outputting the voltage information externally.

Figure 6:
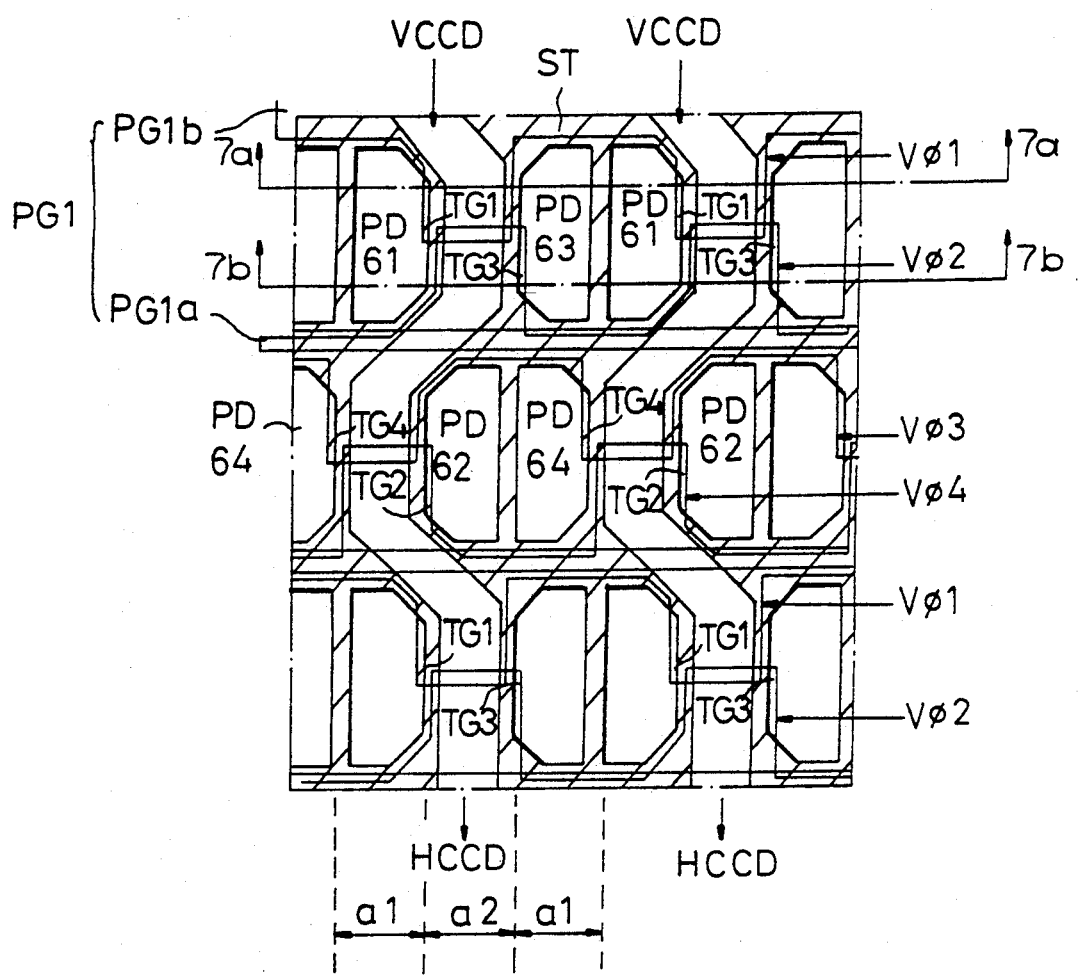
FIG. 6 is a layout diagram of the construction of the CCD image sensor of the interlaced scanning type in FIG. 5.

Referring to FIG. 6, there is shown a layout diagram of the construction of the CCD image sensor of the interlaced scanning type in FIG. 5. As shown in this figure, the CCD image sensor of the present invention comprises a series of four transfer gates TG1-TG4 for transferring the signal charges from the photodiodes PD61-PD64 to the VCCD regions VCCD, respectively. Namely, the first transfer gates TG1 are provided to transfer to the VCCD regions VCCD the signal charges from the first photodiodes PD61 arranged on the left sides of the curved portions of each of the VCCD regions VCCD on the odd horizontal scanning lines in the odd fields and the second transfer gates TG2 are provided to transfer to the VCCD regions VCCD the signal charges from the second photodiodes PD62 arranged on the right sides of the curved portions of each of the VCCD regions VCCD on the even horizontal scanning lines in the even fields. Also, the third transfer gates are provided to transfer to the VCCD regions VCCD the signal charges from the third photodiodes PD63 arranged on the right sides of the curved portions of each of the VCCD regions VCCD on the odd horizontal scanning lines in the odd fields and the fourth transfer gates are provided to transfer to the VCCD regions VCCD the signal charges from the fourth photodiodes PD64 arranged on the left sides of the curved portions of each of the VCCD regions VCCD on the even horizontal scanning lines in the even fields.

The photodiodes PD61-PD64 each is formed to have a width a1 equal to a width a2 of each of the VCCD regions VCCD. Also, the third photodiodes PD63 and the fourth photodiodes PD64 are lined up in a straight line in the vertical direction.

Connected to the first transfer gate TG1 is a first transfer gate electrode PG1b to which a first VCCD clock signal $V\phi1$ is applied, and connected to the third transfer gate TG3 is a second transfer gate electrode PG1a to which a second VCCD clock signal $V\phi2$ is applied. Also connected to the fourth transfer gate TG4 is a third transfer gate electrode PG2b to which a third VCCD clock signal $V\phi3$ is applied, and connected to the second transfer gate TG2 is a fourth transfer gate electrode PG2a to which a fourth VCCD clock signal $V\phi4$ is applied. For this reason, the signal charges from the photodiodes PD61-PD64 are transferred to the VCCD regions VCCD in response to the VCCD clock signals $V\phi1-V\phi4$ of four phases which are applied respectively to the first to fourth transfer gate electrodes PG1b, PG1a, PG2b and PG2a, one clock signal corresponding to one phase.

It is noted that the CCD image sensor constructed in this manner may have such a structure that a plurality of real photodiodes surrounds a virtual photodiode in a case where it is assumed that the virtual photodiode is each of the VCCD regions VCCD. As a result, such structure has the effect of increasing the reliability of data to be written into the virtual photodiode.

Figure 7A:
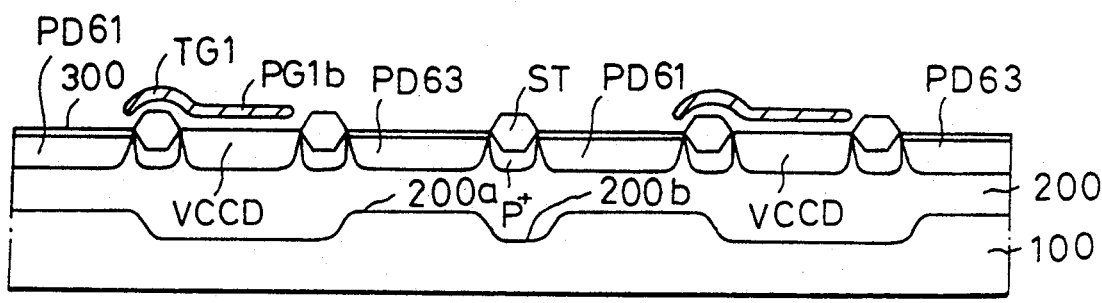
FIG. 7a is a sectional view, taken on the line c—c' of FIG. 6.
Figure 7B:
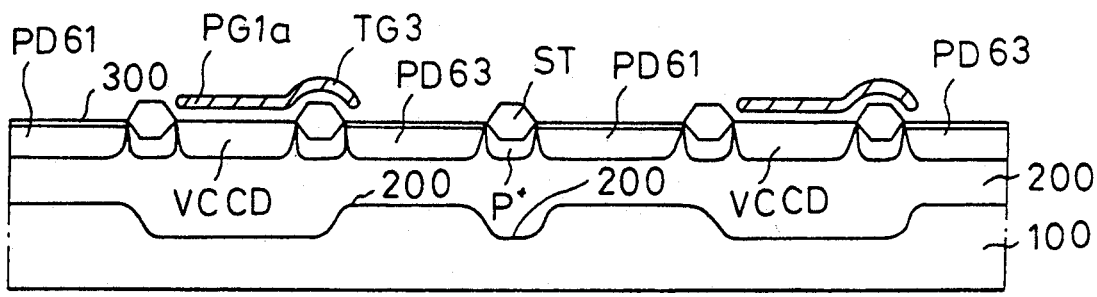
FIG. 7b is a sectional view, taken on the line d—d' of FIG. 6.

FIG. 7a is a sectional view, taken on the line c-c' of FIG. 6 and FIG. 7b is a sectional view, taken on the line d-d' of FIG. 6. The CCD image sensor of the present invention comprises a N type substrate 100 and a P type well 200, formed on the N type substrate 100. The N type VCCD regions VCCD, the first and third N type photodiodes PD61 and PD63 arranged respectively on the left and right sides of each of the VCCD regions VCCD on the odd horizontal scanning lines are, in turn, successively arranged on the N type substrate 100, with adjacent ones of the photodiodes PD61 and PD63 and VCCD regions VCCD being isolated from each other at a desired interval via the channel stop region ST. On the surface of each of the N type photodiodes PD61 and PD63 is formed a P+type thin layer 300 for application of an initial bias voltage. Herein, the P type well 200 is comprised of two types of wells, a shallow P type well 200a and a deep P type well 200b, for control of over flow drain (OFD) voltage, the shallow P type well 200a being formed under each of the N type photodiodes PD61 and PD63 and the deep P type well 200b being formed under each of the N type VCCD regions VCCD.

In FIG. 7a, each of the first transfer gates TG1 is formed over between each of the N type photodiodes PD61 and each of the N type VCCD regions to connect them to each other. Also formed over each of the N type VCCD regions and each of the channel strop regions ST is the first transfer gate electrode PG1b for application of the first VCCD clock signal V$\phi$1. The first transfer gate TG1 is connected to the first transfer gate electrode PG1b. Also, the N type photodiode PD63 and the VCCD region VCCD are isolated from each other at a desired interval via the channel stop region ST.

Figure 1:
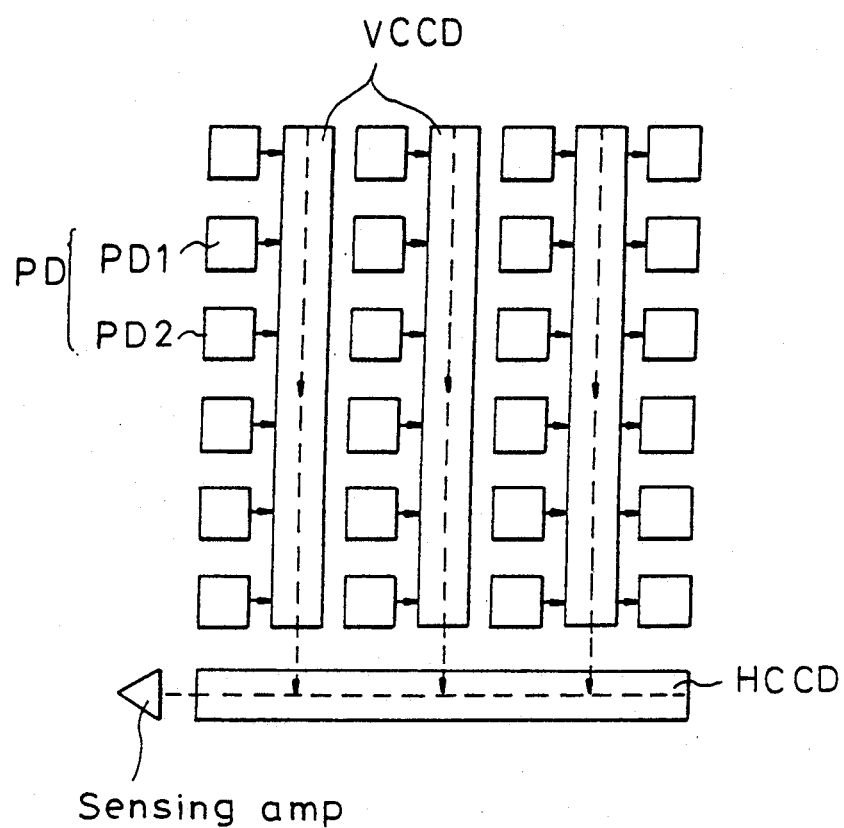
FIG. 1 is a schematic diagram of a construction of a conventional CCD image sensor of the interlaced scanning type.
Figure 2:
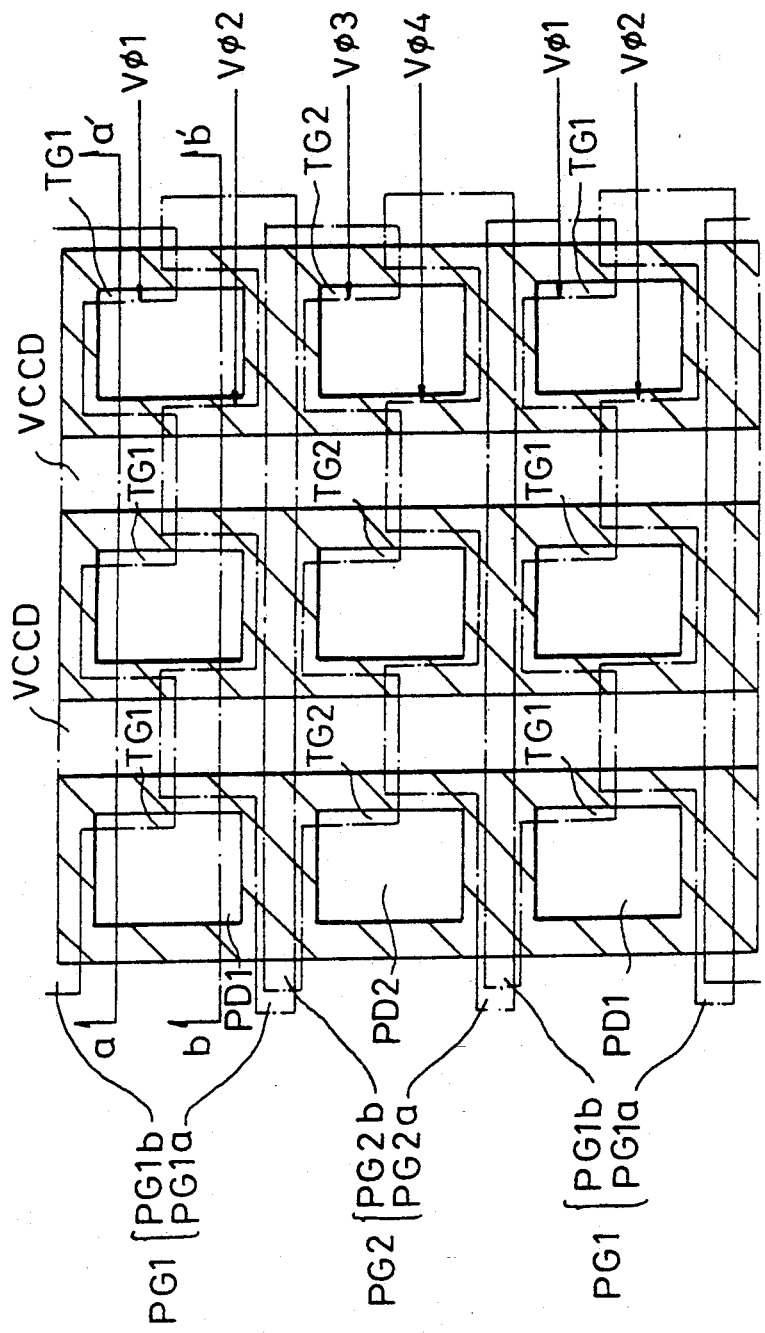
FIG. 2 is a layout diagram of the construction of the conventional CCD image sensor in FIG. 1.
Figure 3A:
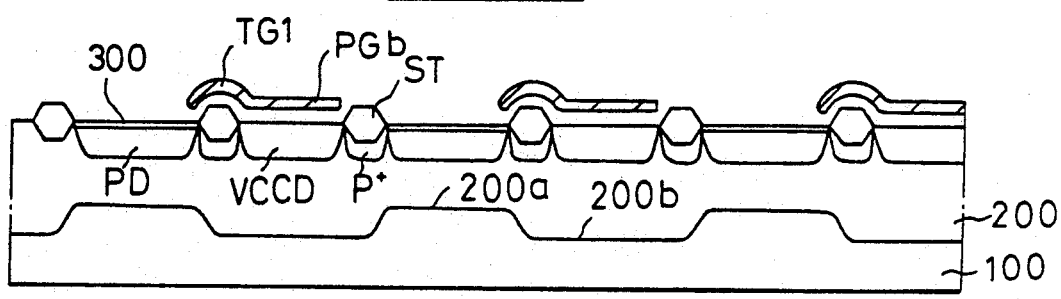
FIG. 3a is a sectional view, taken on the line a—a' of FIG. 2.
Figure 3B:
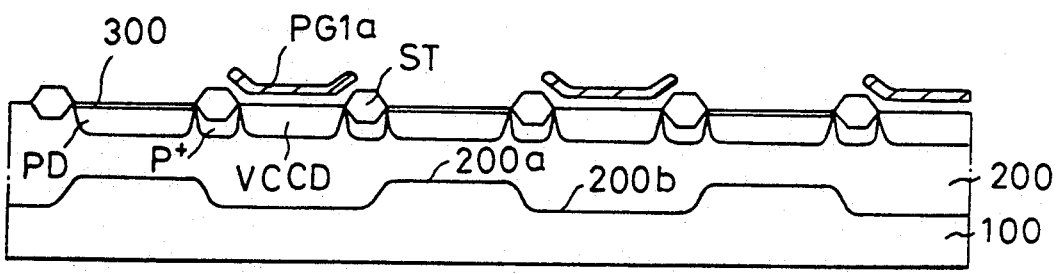
FIG. 3b is a sectional view, taken on the line b—b' of FIG. 2.

On the contrary, in FIG. 3b, each of the third transfer gates TG3 is formed over between each of the N type photodiodes PD63 and each of the N type VCCD regions to connect them to each other. Also formed over each of the N type VCCD regions and each of the channel strop regions ST is the second transfer gate electrode PG1a for application of the second VCCD clock signal V$\phi$2. The third transfer gate TG3 is connected to the second transfer gate electrode PG1a. Also, the N type photodiode PD61 and the VCCD region VCCD are isolated from each other at a desired interval via the channel stop region ST.

The operation of the CCD image sensor with the above-mentioned construction in accordance with the present invention will hereinafter be described in detail.

Figure 8A:
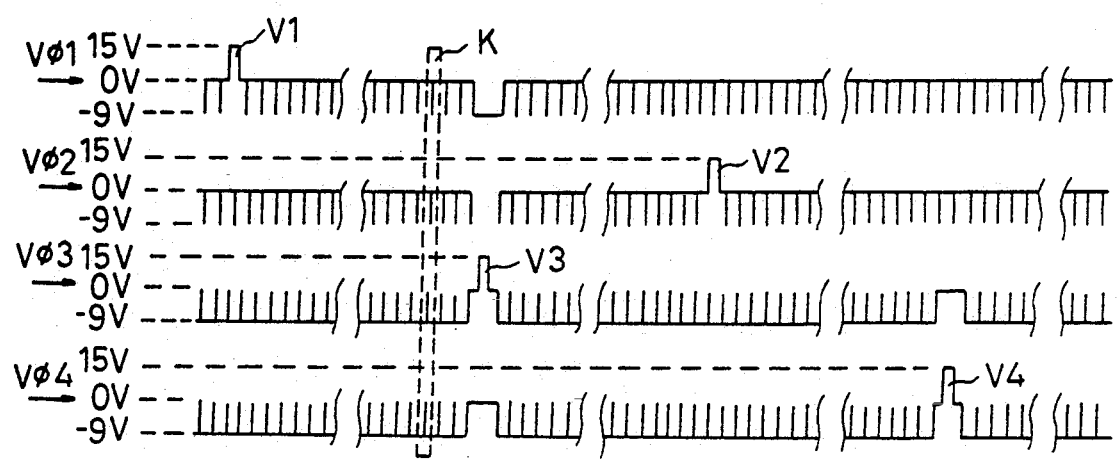
FIG. 8a is a timing diagram of VCCD clock signals according to the present invention.
Figure 8B:
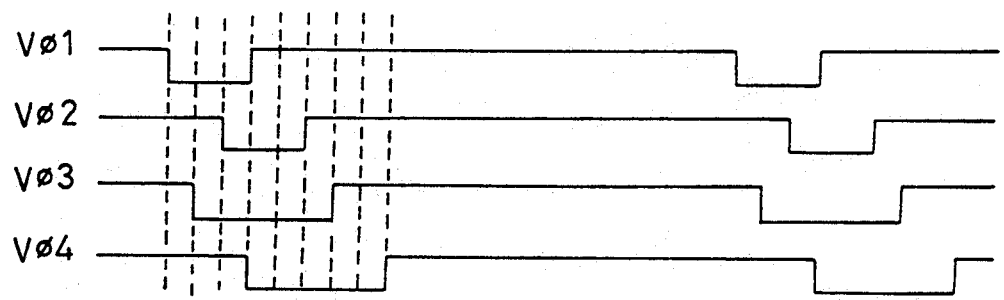

FIG. 8a is a timing diagram of the VCCD clock signals V$\phi$1-V$\phi$4 which are applied respectively to the transfer gate electrodes according to the present invention and FIG. 8b is a pulse waveform diagram of the VCCD clock signals V$\phi$1-V$\phi$4 at the unit interval K of FIG. 8a.

In operation, upon receiving the incident light, the photodiodes PD61-PD64 generate the signal charges in proportion to an intensity of the light. The generated signal charges are transferred to the VCCD regions VCCD in response to the VCCD clock signals V$\phi$1-V$\phi$4 which are applied respectively to the transfer gate electrodes PG1a, PG1b, PG2a and PG2b. In other words, in the odd fields, a voltage V1 of high level is applied to the first transfer gates TG1 by the first VCCD clock signal V$\phi$1 which is applied to the first transfer gate electrodes PG1b. As a result, transferred to the VCCD regions VCCD are the signal charges which are generated from the photodiodes PD61 arranged on the left sides of each of the VCCD regions VCCD on the odd horizontal scanning lines. Also in the odd fields, a voltage V2 of high level is applied to the third transfer gates TG3 by the second VCCD clock signal V$\phi$2 which is applied to the second transfer gate electrodes PG1a. As a result, transferred to the VCCD regions VCCD are the signal charges which are generated from the photodiodes PD63 arranged on the right sides of each of the VCCD regions VCCD on the odd horizontal scanning lines.

On the other hand, in the even fields, a voltage V3 of high level is applied to the fourth transfer gates TG4 by the third VCCD clock signal V$\phi$3 which is applied to the third transfer gate electrodes PG2b. As a result, transferred to the VCCD regions VCCD are the signal charges which are generated from the photodiodes PD64 arranged on the left sides of each of the VCCD regions VCCD on the even horizontal scanning lines. Also in the even fields, a voltage V4 of high level is applied to the second transfer gates TG2 by the fourth VCCD clock signal V$\phi$4 which is applied to the fourth transfer gate electrodes PG2a. As a result, transferred to the VCCD regions VCCD are the signal charges which are generated from the photodiodes PD62 arranged on the right sides of each of the VCCD regions VCCD on the even horizontal scanning lines.

The signal charges transferred to the VCCD regions VCCD are then transferred to the HCCD region HCCD, which feeds the transferred signal charges to the sensing amplifier AMP in response to a HCCD clock signal applied thereto. Finally, the sensing amplifier AMP converts the signal charges from the HCCD region HCCD into voltage information and outputs the voltage information externally.

The image signals outputted in this manner are arranged in a form as shown in FIG. 8c, which is a pixel format of one picture, or one frame which is provided by the CCD image sensor of the interlaced scanning type according to the present invention. Namely, the image signals outputted upon application of the drive voltage V1 to the first transfer gates TG1 in response to the first VCCD clock signal V$\phi$1 are arranged at the positions designated by "1" and the image signals outputted upon application of the drive voltage V2 to the third transfer gates TG3 in response to the second VCCD clock signal V$\phi$2 are arranged at the positions designated by "3". Also, the image signals outputted upon application of the drive voltage V3 to the fourth transfer gates TG4 in response to the third VCCD clock signal V$\phi$3 are arranged at the positions designated by "4" and the image signals outputted upon application of the drive voltage V4 to the second transfer gates TG2 in response to the fourth VCCD clock signal V$\phi$4 are arranged at the positions designated by "2".

FIG. 8d is a pixel format of another picture which is provided by the CCD image sensor of the interlaced scanning type according to the present invention. In this drawing, it is assumed that the VCCD regions VCCD each is a virtual photodiode region. The image signals outputted from the virtual photodiodes are arranged at the positions designated by "C". A value approximate to the real value is obtained by dividing the sum of the image information "1", "2", "3" and "4" obtained in the respective fields by 4. The position "C" is filled with the obtained approximate real value. Further, the other positions "T", "TR", "L", "R", "B" and "BL" are modifications of the position C and are adapted to provide a formula for obtaining virtual photodiodes of image signals positioned at the edge portions of the picture.

As hereinbefore described, in the CCD image sensor according to the present invention, the fill factor of the photodiodes can be increased in the same chip size as the fill factor of the VCCD regions is reduced in the same chip size, so that an improvement in the resolution of the picture can be made in the same chip size. Also, the VCCD regions each can be arranged in the zig-zag pattern capable of positioning the real photodiodes around the virtual photodiodes. Such arrangement has the effect of increasing the reliability of data to be written into the virtual photodiode. Moreover, the areas of the photodiodes can be enlarged to the maximum since the VCCD region can be treated as the virtual photodiode.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A CCD image sensor comprising:
   a plurality of VCCD regions arranged at a constant interval in a horizontal direction with respect to one another, each of the VCCD regions being formed in a zig-zag pattern having a series of curved portions in a vertical direction and being extended to a desired length in the vertical direction;
   a plurality of groups of first to fourth photodiodes each for generating a signal charge in response to incident light, the first to fourth photodiodes of the respective groups being arranged respectively on the left and right sides of each of said VCCD regions and being isolated from the adjacent VCCD regions via channel stop regions, the first photodiodes being arranged on the left sides of the curved portions of each of said VCCD regions on odd horizontal scanning lines, the second photodiodes being arranged on the right sides of the curved portions of each of said VCCD regions on even horizontal scanning lines, the third photodiodes being arranged on the right sides of the curved portions of each of said VCCD regions on the odd horizontal scanning lines, and the fourth photodiodes being arranged on the left sides of the curved portions of each of said VCCD regions on the even horizontal scanning lines;
   a HCCD region for transferring in the horizontal direction the signal charges which are transferred from said first to fourth photodiodes through said VCCD regions thereto;
   a plurality of first transfer gates for connecting said first photodiodes to each of said VCCD regions;
   a plurality of second transfer gates for connecting said second photodiodes to each of said VCCD regions;
   a plurality of third transfer gates for connecting said third photodiodes to each of said VCCD regions;
   a plurality of fourth transfer gates for connecting said fourth photodiodes to each of said VCCD regions;
   a plurality of first transfer gate electrodes each formed over each of said channel stop regions and each of said VCCD regions, the first transfer gate electrodes being connected respectively to said first transfer gates for application of a first VCCD clock signal;
   a plurality of second transfer gate electrodes each formed over each of said channel stop regions and each of said VCCD regions, the second transfer gate electrodes being connected respectively to said third transfer gates for application of a second VCCD clock signal;
   a plurality of third transfer gate electrodes each formed over each of said channel stop regions and each of said VCCD regions, the third transfer gate electrodes being connected respectively to said fourth transfer gates for application of a third VCCD clock signal; and
   a plurality of fourth transfer gate electrodes each formed over each of said channel stop regions and each of said VCCD regions, the fourth transfer gate electrodes being connected respectively to said second transfer gates for application of a fourth VCCD clock signal.

2. A CCD image sensor as set forth in claim 1, wherein said VCCD regions and said first to fourth photodiodes have the same width.

3. A CCD image sensor as set forth in claim 1, wherein said third photodiodes and said fourth photodiodes are lined up in a straight line in the vertical direction.

* * * * *